Aug. 18, 1959  P. Z. RIDER  2,900,131
READOUT MEANS FOR ACCOUNTING MACHINES
Filed Jan. 20, 1956  3 Sheets-Sheet 1

INVENTOR
PAUL Z. RIDER
BY
ATTORNEY

Aug. 18, 1959 P. Z. RIDER 2,900,131
READOUT MEANS FOR ACCOUNTING MACHINES
Filed Jan. 20, 1956 3 Sheets-Sheet 2

INVENTOR
PAUL Z. RIDER
BY John L. Sterling
ATTORNEY

United States Patent Office 2,900,131
Patented Aug. 18, 1959

2,900,131

READOUT MEANS FOR ACCOUNTING MACHINES

Paul Z. Rider, Stamford, Conn., assignor to Sperry Rand Corporation, New York, N.Y., a corporation of Delaware Application January 20, 1956, Serial No. 560,314

7 Claims. (Cl. 235—59)

This invention relates generally to recording and computing machines, such as bookkeepers and the like, wherein multi-denominational values are entered therein and read-out therefrom serially, one order at a time, the invention relating more particularly to the means by which the values may be read-out from the machine.

The invention is disclosed herein in an embodiment adapted for reading out balances from the cross totalizers of a bookkeeping machine of the general type such as is shown in United States patent to E. O. Roggenstein No. 2,412,537, issued December 12, 1944, and patent to E. O. Roggenstein et al., No. 2,585,685, issued February 12, 1952. In the type of machine disclosed in the aforesaid patents the operation of any numeral key causes the respective value to be entered in the accumulating mechanism which includes both vertical and cross totalizers or registers. The vertical totalizers accumulate the values relating to respective columns of the ledger sheet or statement being prepared, and the cross totalizers are employed to accumulate the values represented in a line of the ledger sheet or statement. Said totalizers are mounted on the carriage of the machine, and means are provided for taking an automatic balance from the cross totalizers for each line on the statement or ledger sheet being prepared. As described in said patents, an automatic balance operation is carried out by causing the carriage at the proper predetermined carriage position, to automatically escape through the balance column. Associated with each order of the cross totalizers is a contact disc formed with a contact lug and driven from its respective order wheel of the totalizer so as to thereby indicate the value registered in the totalizer. A sensing or read-out head is disposed on the frame of the machine adjacent said cross totalizer, said sensing head being provided with a contact element corresponding to each of the ten digits, each of said contacts being electrically connected to means such as a solenoid, for actuating the corresponding numeral key of the machine.

Formerly, as in the machines of said aforesaid patents, the contact elements of the sensing head were disposed so as to be engaged and make electrical connection with one of the contact discs of the totalizer only after the carriage has completed each escapement operation. To achieve this result required complex mechanism in the sensing head necessitated in part by the unavoidable tendency of the carriage to rebound as it settles into each successive escapement position. Also, the mechanism of the sensing head had to provide for unrestricted carriage return movement, and the circuits associated therewith required relatively heavy amounts of current.

The features of the instant invention, as disclosed and described herein, constitute an improvement, avoiding the former difficulties and disadvantages above mentioned, in that the design of the sensing head is greatly simplified and less costly to manufacture, requires little or no adjustment, and the novel circuits associated therewith require much less current thereby contributing to the reliability and long life thereof and eliminating deterioration of the contact elements from arcing as was formerly experienced. In carrying out the invention the contact elements of a sensing head are disposed so as to be only momentarily wiped by one of the contact lugs associated with the totalizer as the carriage escapes from one escapement position to the next. The circuit associated with the sensing head is provided with means for storing the signal created by this momentary wiping action until the carriage has come to rest at the end of the escapement operation. After the carriage is finally settled at the end of an escapement operation, the stored signal is then released to cause actuation of the numeral key which prints the respective digit.

It is therefore an object of the invention to improve upon the structure and operation of the read-out means for use with machines of the type herein described.

It is an additional abject of the invention to simplify the construction of a sensing head for a machine in the class herein described whereby the cost of manufacturing is reduced and the necessity for close adjustment of the moving parts is eliminated.

It is a still further object of the invention to increase the efficiency, reliability and durability of sensing of read-out means for use with a machine of the type herein described.

Further objects of the invention together with the features contributing thereto and advantages accruing therefrom will become apparent from the following description when read in conjunction with the drawings wherein.

For a fuller understanding and explanation of the basic operation of the machine, which operation is not directly concerned with the invention disclosed herein, reference may be had to the U.S. Patents Nos. 2,412,537 and 2,585,685, aforementioned. Generally and briefly stated, each numeral key of the machine is connected with totalizer actuating mechanism in such a way that said actuating mechanism is moved differential amounts corresponding to the value of the numeral key which has been operated. The totalizers are mounted on the carriage of the machine and are so aligned with the totalizing mechanism that, as a multi-denominational digit is being typed in a particular column of the ledger sheet or statement, the value in each order of the number being typed is entered in the corresponding differential order of the totalizer. Upon completion of the entries in the several columns of the ledger sheet a balance may be taken from a cross totalizer by tabulating the carriage of the machine to the balance column of the ledger sheet. As aforementioned, an automatic balance operation is effected by escaping the carriage through the balance column whereby the values registered in the several orders of the totalizer are sensed one at a time to cause actuation of the associated typewriter numeral keys to thereby print in the balance column of the ledger sheet the value registered in the cross totalizer.

Figure 1:
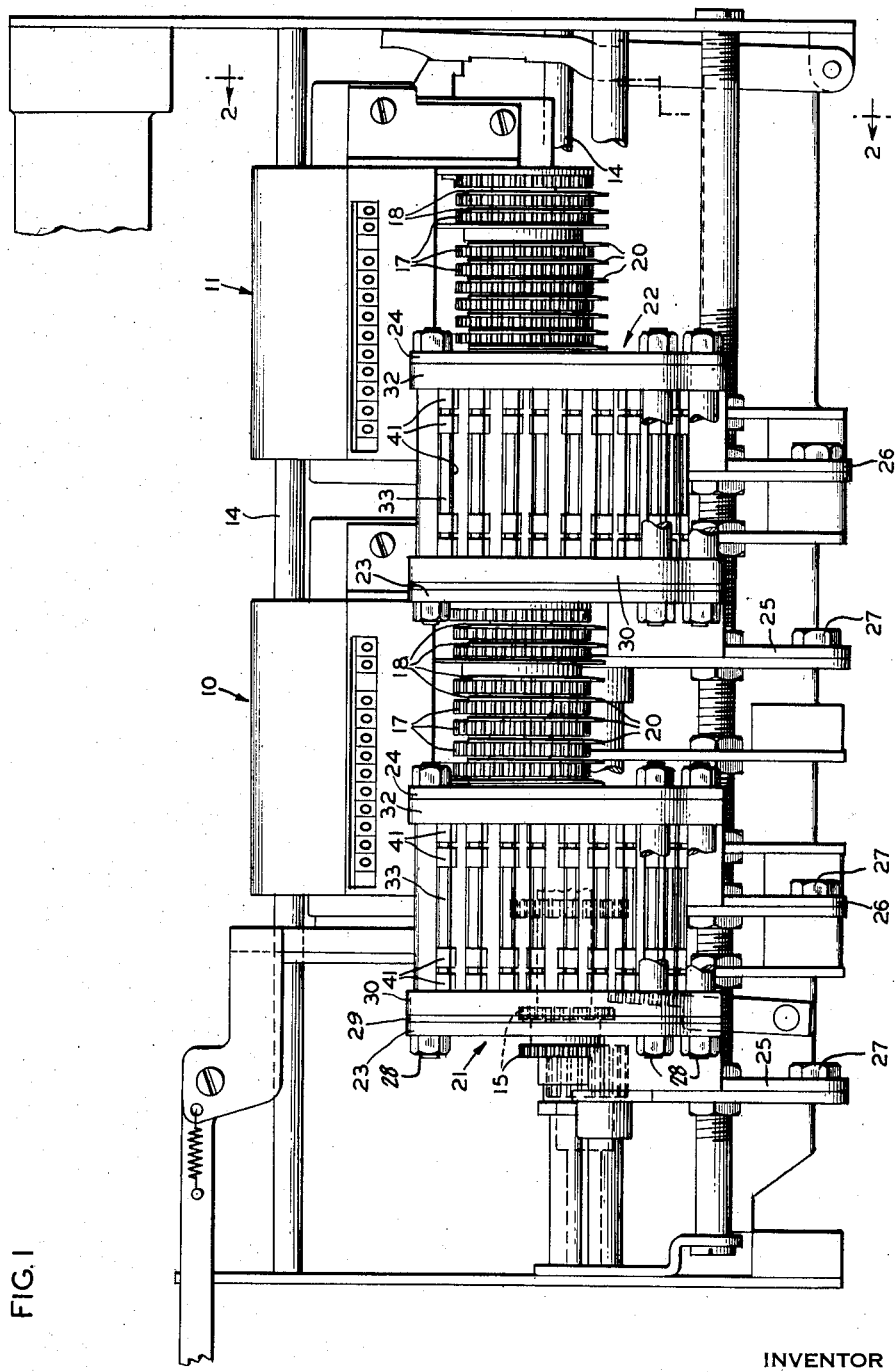
Fig. 1 is a view in front elevation of a portion of a bookkeeping machine showing the two cross totalizers thereof and the read-out or sensing heads associated therewith.
Figure 2:
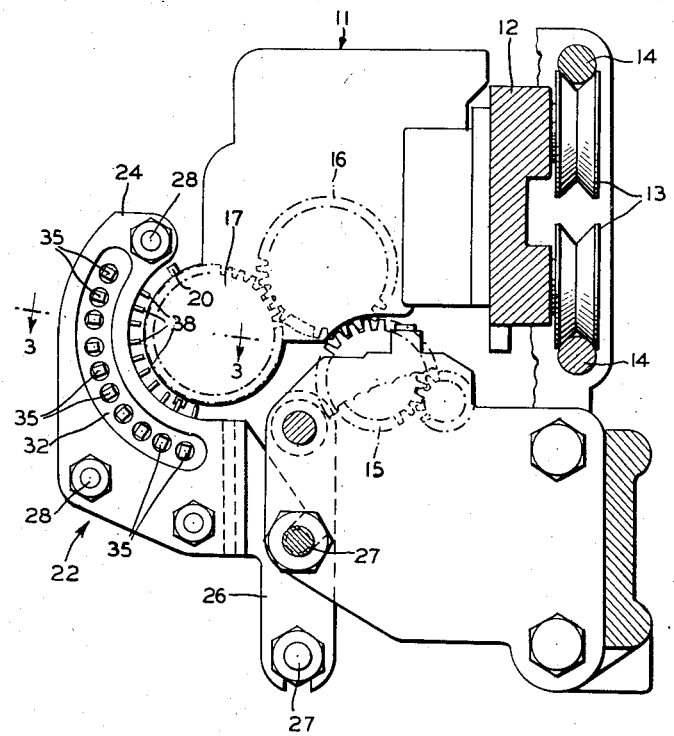
Fig. 2 is a view in section, taken along lines 2—2 of Fig. 1.

As can be seen in Fig. 1, the machine herein disclosed is equipped with two cross totalizers which are designated a left hand cross totalizer 10 and a right hand cross totalizer 11. As can be best seen in Fig. 2 the totalizers are mounted on a portion of the carriage 12 which is provided with flanged wheels 13 which support and guide the carriage for longitudinal carriage movement along guide rails 14. The totalizers and the means for actuating them are similar to the corresponding portions of the machines disclosed in the aforesaid U.S. patents. The totalizer actuating mechanism includes a gear 15 driven differentially in accordance with the value represented by one of the numeral keys, said gear meshing in succession with the carrier gears 16 of which there is one in each denominational order of the totalizer. Each order of the totalizer also includes a gear 17 driven from its associated carrier gear 16, each gear 17 carrying with it a contact disc 18 provided with contact projections or lugs 20 about its periphery. In the present instance the gear 17 is provided with thirty teeth and is driven at a ratio of one to three with the resultant wheel of the totalizer. For this reason the contact disc 18 is provided with three contact lugs 20 spaced equi-distant (120°), about its circumference so as to thereby be able to indicate within one third of a revolution any value represented throughout a full revolution of the associated resultant gear of the totalizer.

Associated with each of the two cross totalizers is a sensing or read-out head designated the left hand read-out head 21 and the right hand read-out head 22. The two read-out heads are of identical construction and of improved and modified design over that disclosed in the aforesaid U.S. patents. Each read-out head is contained and supported between a pair of side frame plates 23, 24, each of said frame plates having leg portions 25 and 26, respectively, which are formed with double reverse bends so as to support the reading head in an offset manner to the frame of the machine by means such as bolts 27. The plates 23 and 24, as thus seen in Fig. 2, define an arcuate outline which is concentric with the gear 17 and contact disc 18 of the associated totalizer, and are connected together rigidly by cross rods 28.

Figure 3:
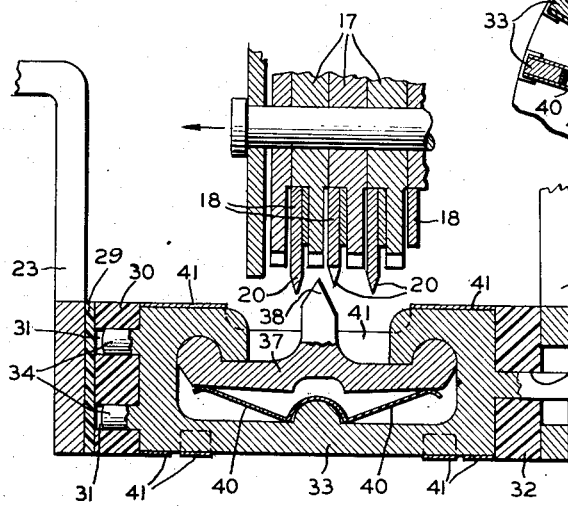
Fig. 3 is a sectional view taken along the lines 3—3 of Fig. 2.
Figure 4:
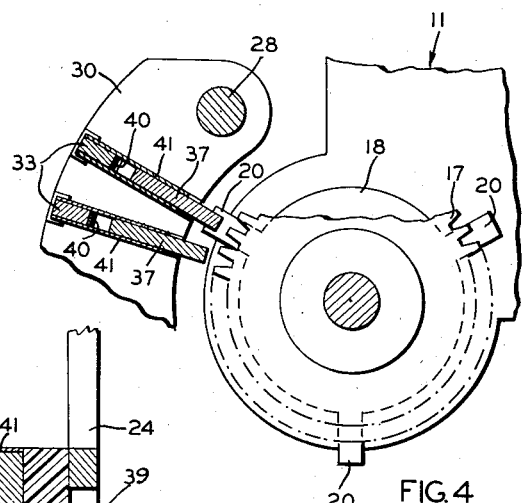
Fig. 4 is a detailed section through a portion of one of the totalizers and a portion of the reading head associated therewith.

Lining the inner face of the frame plate 23 is a thin layer of insulating material 29, and disposed inwardly of said layer is an additional thicker layer of insulating material 30, which as can be best seen in Fig. 3, is provided at spaced intervals with pairs of perforations 31 therein. Lining the inner face of the sensing head frame plate 24 is a layer of insulating material 32 which at spaced intervals throughout its length is provided with a single perforation 39. Supported between the layers of insulating material 30, 32 is a series of contact receptacles 33 which are formed with nipples 34 fitting in to the perforations 31 of the insulator 30 and on the other side being formed with a contact tip 35 extending through the perforation 39 of insulator 32 and through a slotted portion of the frame plate 24.

Contained within each receptacle 33 is a contact element 37 formed with a beveled contact tip 38 disposed for engagement by the contact lugs 20 on the contact discs 18 of the associated totalizer. The element 37 is made of conducting material and is formed with armed portions having curvilinear tips which are seated in recesses formed in the receptacle 33 under the influence of a leaf spring 40. A jacket or envelope 41, cut away in the area of the contact 38, is wrapped around the receptacle 33 so as to properly retain the contact element 37 and spring 40 in their proper assembled position within the receptacle.

Figure 5:
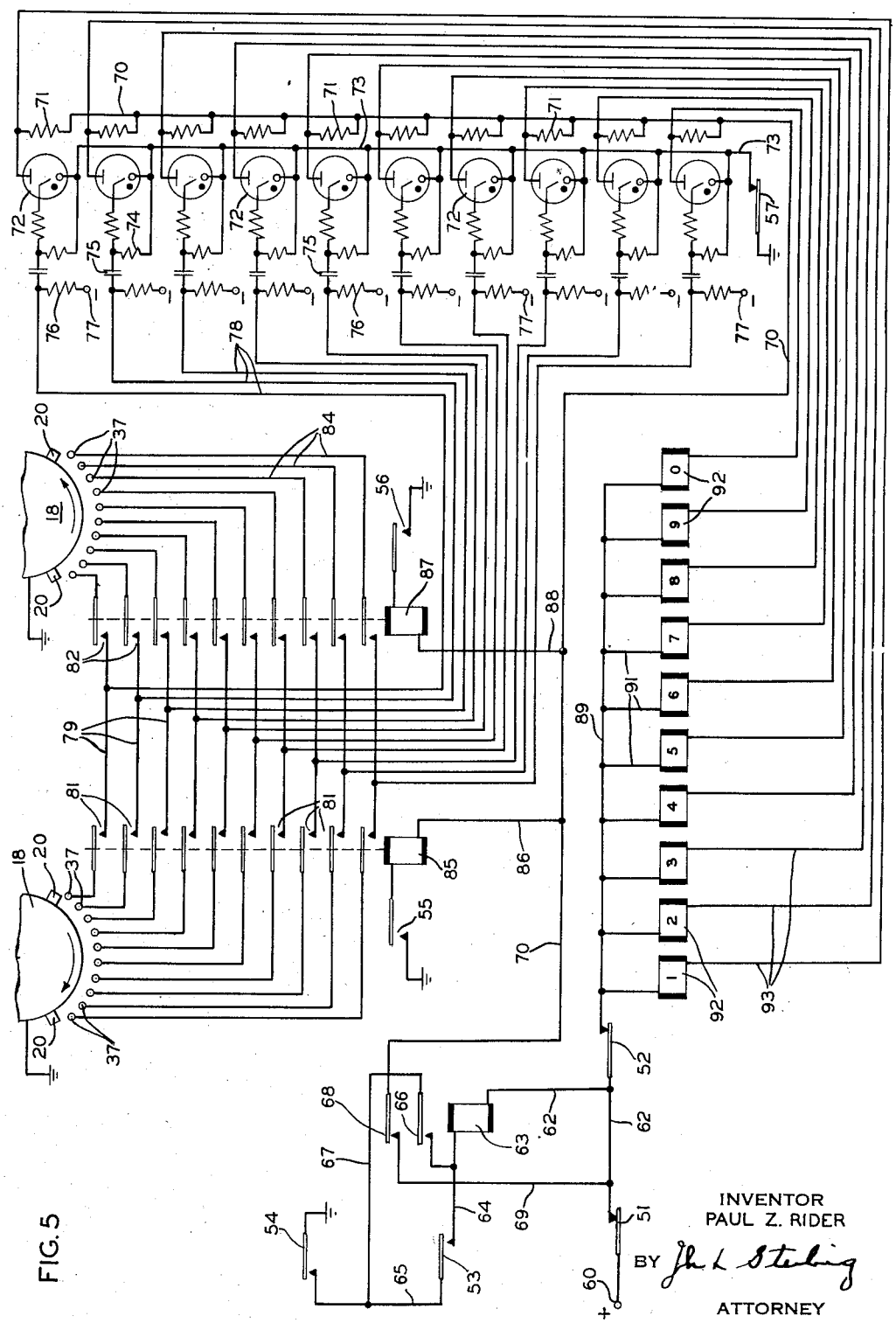
Fig. 5 is a wiring diagram of the read-out or sensing circuit.

Fig. 3 shows the relative disposition of the contact tip 38 to the contact discs 18 of the totalizer when the carriage of the machine is at rest after an escapement operation. It will be seen that as the carriage escapes from right to left, in the direction of the arrow, the contact lug 20 of one of the contact discs 18 will momentarily wipe against the tip 38 of a selected one of the contact elements 37 rocking the contact element 37 against the tension of its spring 40 and thereby making a momentary electrical connection for completing a read-out circuit, the operation of which circuit will be described hereinafter. When the escapement movement of the carriage is completed, the momentary contact made with one of the contact elements 37 will have been broken, and the parts will assume the position as shown in Fig. 3. The wiring diagram of the read-out circuits, see Fig. 5, includes a number of contacts which are not structurally shown herein but which all operate in a well known manner in cooperation with the standard functions of the machine and which are shown in the U.S. patents hereinbefore mentioned. These contacts include the carriage return contact 51, the escapement contact 52, the tabulator release contact 53, the control cam contacts 54, 55, 56, the latter two of which are referred to herein as the register selection contacts, and the actuator contact 57. The carriage return contact 51 is normally closed and operates to open the circuit to the power supply during carriage return operations, it being shown as contact 104 in the aforesaid Patent No. 2,585,685. The escapement contact 52 is operated by the rocker dog of the escapement mechanism so as to break contact while the carriage is escaping and to make contact when the carriage comes to rest after each escapement operation. It is shown and referred to as contact 420 and also the escapement COM in the aforesaid Patent No. 2,585,685. The tabulator release contact 53 is operated each time the carriage of the machine is tabulated into a new column position and is referred to as the Tab Break contact 275 in the aforesaid Patent No. 2,585,685. In the present instance however, as opposed to the functioning of this contact in said patent, the tab-release contact 53 is normally open and is momentarily closed on the completion of the carriage tabulation operation. The control cam contacts 54, 55 and 56 are operated selectively through control cams which are placed at predetermined points of the carriage so as to operate the contacts at corresponding escapement positions of the carriage. In the present instance these contacts are all normally open and comprise some of the contacts referred to as control cam contacts 285 in the aforesaid Patent No. 2,585,685. The actuator contact 57 is a normally closed contact and opens momentarily upon the operation of any numeral key of the machine. It is one of the contacts of the switch referred to as the actuator switch in the Patent No. 2,412,537.

A source of positive power supply, which in the present instance is at 150 volts, is applied at a terminal 60. An automatic balance operation is initiated by tabulating the carriage of the machine to a balance column of the ledger sheet whereupon the tabulator release contact 53 is momentarily closed and the control cam contact 54 is closed and held closed throughout the automatic balance operation as the carriage escapes through the entire balance column. The closure of contacts 53, 54 completes a circuit from the positive supply terminal 60, through the carriage return contacts 51, a lead 62 to the winding of a relay 63, which is of the slow release type and herein referred to as the automatic balance relay, from the relay 63 over lead 64, through contacts 53, lead 65 and contacts 54 to ground. The automatic balance relay 63 locks up for the remainder of the automatic balance operation through its locking contact 66 in a lead 67 which connects lead 64 with lead 65 to complete a circuit around the tabulator release contacts 53 which, aforementioned, closes only momentarily as the carriage of the machine is tabulated to the balance column. The closure of the contacts 68 of the automatic balance relay 63 completes a plate supply circuit from the positive terminal 60 through the carriage return contact 51, leads 69, 70 to the plate of each of the control tubes 72, which in the present instance are thyratrons of the cold cathode glow discharge type, and of which there is one associated with each numeral key of the machine, each plate being connected to the supply lead 70 through a resistor 71. The cathode of each of said tubes is connected to a common lead 73 which connects each cathode to ground through the actuator contacts 57. The control or starter electrode of each tube, in addition to being referenced through their resistors 74 to ground through the common ground lead 73, are coupled through condensers 75 and resistors 76 to a negative supply 77, which in the present instance is at 150 volts potential.

The negative supply coupled with each starter electrode is connected through a respective lead 78 to conductor 79 common to stacked contacts 81, 82. The stack of contacts 81 are each connected through leads 83 to the respective contact elements 37 in the read-out head of the lefthand cross totalizer, and the stack of contacts 82 are each connected through leads 84 to the contact elements 37 of the righthand cross totalizer read-out head. The stack of contacts 81 are closed upon energization of a register selection relay 85, the winding of which is connected on the one side to the plate supply lead 70 and on the other side to ground through a control cam contact 55. The stack of contacts 82 are closed by energization of a register selection relay 87, the winding of which is connected by lead 88 on the one side to the plate supply lead 70 and on the other side to ground through the control cam contact 56. The control cam which operates contact 55 is so located on the carriage as to close contacts 55 whenever the carriage in position for reading out the lefthand cross totalizer, and likewise the control cam for actuating the contacts 56 is positioned on the carriage so as to close contacts 56 whenever the carriage is in position for reading out the righthand cross totalizer. Accordingly, at the start of any automatic balance operation one or the other of the register relays 85, 87 will be energized thereby completing the circuits from the respective reading head to the negative supply 77.

Each of the contact discs 18 of the respective cross totalizers is connected to ground. It will be apprarent that as the carriage escapes from one position to the next during the automatic balance operation, one of the contact elements 37 of whichever read-out head has been selected will be momentarily wiped by the contact lug 20 of a disc 18, thereby momentarily completing a circuit to ground from the negative supply 77 associated with one of the tubes 72.

The momentary grounding of the negative supply through one of the contacts of the sensing head, results in a positive pulse on the starter electrode on the corresponding tube 72, causing said tube to ignite. The tube continues to fire, thus storing the signal, as long as the cathode thereof is connected to ground through the actuator contacts 57, said contacts as aforementioned being opened whenever a numeral key of the machine is operated. It will be apparent that the tube 72 which fires corresponds to the value represented by the position of the contact disc 18 as it escapes past the contacts 37 of the associated reading head, and that the ignition of the tube is accomplished while the carriage is in motion. While the carriage is in motion the escape contacts 52 are opened, and after the carriage has settled the escapement contacts 52 close, as aforementioned, to thereby establish secondary parallel supply circuits from the positive source to the plates of each of the tubes 72. These parallel circuits run from the source terminal 60, carriage return contacts 51, lead 62, the escapement contacts 52 now closed, a common conductor 89, individual leads 91 to the respective numeral key actuating solenoids 92 of which there is one for actuating each numeral key on the machine, and thence from each solenoid by leads 93 directly to the plate or anode of their respective tube 72. The energization of one of the solenoids 92 causes the associated numeral key to be operated thus printing the value represented thereby on the ledger sheet or statement, in the well known manner. Thus it will be seen that whatever value is registered in an order of the cross totalizer, as represented by the differential position of the contact disc 18 associated therewith, will be sensed by a corresponding contact element 37 on the associated read-out head during the escapement movement on the carriage completing a circuit to cause a firing and storage of a signal in the corresponding one of the tubes 72. The signal is thus stored until the carriage resettles after the escapement operation, whereupon it is utilized to energize the corresponding solenoid 92 to result in printing on the ledger sheet the corresponding value, thereby completing the read-out function for the respective denominational order of the balance registered in the cross totalizer. After the value is printed the actuator contacts 57 are opened to thereby extinguish the tubes 72 thus conditioning the circuit for read-out of the next denominational order of the balance.

While there has been described and disclosed herein what is considered to be a preferred embodiment of the invention, it is obvious that many changes in form could be made without departing from the spirit of the invention, and it is intended, therefore, that the invention be not limited to the exact form herein shown and described, nor to anything less than the whole of the invention as hereinbefore set forth and hereinafter claimed.

What I claim as new, and desire to secure by Letters Patent is:

1. In a machine of the character described having a carriage adapted for escapement movement and a totalizer associated therewith, the several denominational orders thereof relating to respective escapement positions of said carriage, read-out means comprising a contact member for each denominational order of said totalizer differentially driven to indicate the value in the respective order, sensing means including a contact element for each digital value and disposed for a momentary selective engagement by one of said contact members during the carriage escapement movement, and storage means connected to each contact element for holding the read-out signal until the carriage escapement movement is completed.

2. In a machine of the character described having a carriage adapted for escapement movement and a totalizer associated therewith, the several denominational orders thereof relating to respective escapement positions of said carriage, each order of said totalizer including a contact member differentially driven to indicate the value registered therein, a read-out head supported adjacent to said totalizer and including a contact element for each digital value, said contact elements being arranged in an arcuate series concentric to each contact member and disposed to make momentary engagement with one of said contact members during the escapement movement of the carriage, and read-out circuits controlled by each of said contact elements, said circuits including storage means for holding the read-out signal generated by the engagement of a contact member with a contact element until the carriage escapement movement is completed.

3. In a computing machine of the character described having a carriage adapted for escapement movement and a totalizer associated therewith, the several denominational orders thereof relating to respective escapement positions of said carriage, read-out means comprising a contact member for each order of said totalizer and differentially driven to indicate the value registered in the respective order of said totalizer, sensing means including a contact element for each digital value and disposed for momentary selective engagement by one of said totalizer contact members during the escapement movement of said carriage, and a read-out circuit connected to each contact element, said circuit including storage means for holding the read-out signal generated by the engagement of a contact member with a contact element, and actuators rendered effective upon the completion of the carriage escapement movement for causing the value read-out to be recorded.

4. In a machine of the character described having a carriage adapted for escapement movement and a totalizer associated therewith, the several denominational orders thereof relating to respective escapement positions of said carriage, each order of said totalizer including a contact member differentially driven to indicate the value registered therein, a read-out head disposed adjacent said totalizer, said head including a contact element for each digital value, said contact elements being supported in said head in an arcuate series concentric to said contact members and arranged for a selective engagement by a contact member momentarily during the escapement movement of said carriage, and a read-out circuit connected to each of said contact elements, said circuit including storage means for holding the read-out signal generated by the contact of a contact member with a contact element, and an actuator associated with each storage means and rendered effective upon the completion of the carriage escapement movement for causing the value read-out to be recorded.

5. In a machine of the character described having a totalizer carried through a succession of escapement positions, said totalizer including a differentially driven and grounded contact member in each denominational order thereof for indicating a numerical value, a read-out circuit including a sensing contact element for each digital position of said contact member, a source of negative potential connected to each of said elements, a control tube for each of said elements, the starter electrode of each tube being coupled to the negative potential source for the respective contact element, the cathode of each tube being connected to ground, and a source of positive potential applied in common to the anodes of said tubes, whereby the momentary grounding of said negative source through a contact element and a contact member during escapement of said totalizer causes ignition and continued firing of the associated tube after said momentary grounding is completed.

6. In a machine of the character described having a totalizer carried through a succession of escapement positions, said totalizer including a grounded contact member differentially driven for indicating a numeral value, a read-out circuit including a sensing contact element for each digital position of said contact member, a source of negative potential connected to each contact element, a control tube for each of said contact elements, the starter electrode of each tube being coupled to the negative potential source for the respective contact element, the cathode of each tube being connected to ground, a source of positive potential applied in common to the anodes of said tubes, a secondary supply circuit connected to the anode of each of said tubes, each of said secondary circuits including an actuator for causing the respective digital value to be recorded, and contact means operated upon completion of the escapement movement of said totalizer for connecting said secondary circuits to said source of positive potential, whereby the momentary grounding of said negative source through a contact element and said contact member during escapement of said totalizer creates a read-out signal which is stored in the respective tube until released for energizing the associated actuator after the escapement movement of the totalizer is completed.

7. In a machine of the character described having a totalizer carried through a succession of escapement positions, said totalizer including a grounded contact member in each order thereof and differentially driven for indicating a numerical value, a read-out circuit including a sensing contact element for each digital position of said contact member, a source of negative potential connected to each contact element, a control tube for each of said contact elements, the starter electrode of each tube being coupled to the negative potential source for the respective contact element, the cathodes of said tubes being connected to ground, a source of positive potential applied in common to the anodes of said tubes, a secondary supply circuit connected to the anode of each thyratron and arranged in parallel with said common anode supply circuit, each of said secondary circuits including an actuator effective for causing the respective digital value to be recorded, contact means actuated upon the completion of each escapement movement of said totalizer for connecting said secondary circuits to said positive supply source, and contact means responsive to the operation of any one of said actuators for disconnecting the cathodes of said tubes from ground, whereby a read-out signal generated by the engagement of a contact member with one of said contact elements is stored in the associated tube and released upon a completion of the escapement movement of said totalizer to render the associated actuator effective to record the respective value and to extinguish the tube.

References Cited in the file of this patent

UNITED STATES PATENTS

| | | |
|---|---|---|
| 2,412,537 | Roggenstein | Dec. 10, 1946 |
| 2,512,860 | Henrich | June 27, 1950 |
| 2,536,955 | Palmer et al. | Jan. 2, 1951 |
| 2,554,835 | Mallina | May 29, 1951 |